(12) United States Patent
Kim

(10) Patent No.: US 9,869,806 B2
(45) Date of Patent: Jan. 16, 2018

(54) INCIDENT BEAM POLARIZATION DEPENDENT OPTICAL DEVICE WITH VARIABLE FOCUSING BEAM PATTERN

(71) Applicant: KYUNGPOOK NATIONAL UNIVERSITY INDUSTRY-ACADEMIC COOPERATION FOUNDATION, Daegu (KR)

(72) Inventor: Hak-Rin Kim, Daegu (KR)

(73) Assignee: KYUNGPOOK NATIONAL UNIVERSITY INDUSTRY-ACADEMIC COOPERATION FOUNDATION, Daegu (KR)

(*) Notice: Subject to any disclaimer, the term of this patent is extended or adjusted under 35 U.S.C. 154(b) by 137 days.

(21) Appl. No.: 14/786,645

(22) PCT Filed: Oct. 18, 2013

(86) PCT No.: PCT/KR2013/009358
§ 371 (c)(1),
(2) Date: Oct. 23, 2015

(87) PCT Pub. No.: WO2014/193048
PCT Pub. Date: Dec. 4, 2014

(65) Prior Publication Data
US 2016/0070032 A1    Mar. 10, 2016

(30) Foreign Application Priority Data

May 28, 2013  (KR) ........................ 10-2013-0060385

(51) Int. Cl.
*G02B 5/30* (2006.01)
*G02B 27/28* (2006.01)
*G02B 3/00* (2006.01)

(52) U.S. Cl.
CPC ......... *G02B 5/3016* (2013.01); *G02B 3/0068* (2013.01); *G02B 27/285* (2013.01); *G02B 3/005* (2013.01)

(58) Field of Classification Search
CPC .... G02B 3/005; G02B 3/0068; G02B 5/3016; G02B 27/285
(Continued)

(56) References Cited

U.S. PATENT DOCUMENTS 9,645,407 B2 * 5/2017 Kim ....................... G02B 3/005
2007/0035672 A1   2/2007 Shestak et al.
(Continued)

FOREIGN PATENT DOCUMENTS

CN        1836453        9/2006
CN        1908734        2/2007
(Continued)

OTHER PUBLICATIONS

International Search Report—PCT/KR2013/009358 dated Feb. 26, 2014.

*Primary Examiner* — Dung Nguyen
(74) *Attorney, Agent, or Firm* — Cantor Colburn LLP

(57) ABSTRACT

An optical device with variable focused beam pattern includes a first lens structure configured by arranging first lenticular lenses which are formed with liquid crystals or liquid crystal polymers having a first extraordinary refractive index axis direction and of which longitudinal axes are aligned with a first alignment direction, and a second lens structure laminated on a beam emitting surface of the first lens structure and configured by arranging second lenticular lenses which are formed with liquid crystals or liquid crystal polymers having a second extraordinary refractive index axis direction and of which longitudinal axes are aligned with a second alignment direction. A beam pattern of output (Continued)

light output from the second lens structure is determined according to a polarization direction of the incident beam incident on the first lens structure, the first and second extraordinary refractive index axis directions of the first and second lens structures, and the first and second alignment directions of the first and second lens structures.

12 Claims, 11 Drawing Sheets

(58) Field of Classification Search
 USPC .................. 349/359, 319, 383, 625, 867
 See application file for complete search history.

(56) References Cited

U.S. PATENT DOCUMENTS

2007/0153402 A1     7/2007   Destain
2012/0260986 A1* 10/2012   Chen ..................... G02F 1/29
                                                                                     349/1

FOREIGN PATENT DOCUMENTS

| | | |
|---|---|---|
| JP | 2005208644 | 8/2005 |
| JP | 2006085801 | 3/2006 |
| JP | 2006227036 | 8/2006 |
| JP | 2009237461 | 10/2009 |
| KR | 1020060041125 | 5/2006 |

* cited by examiner

Figure 4

| FIRST LENS (LENS PITCH $W_1$) | SECOND LENS (LENS PITCH $W_2$) | | POLARIZATION OF INCIDENT BEAM | OUTPUT BEAM PATTERN ON FOCAL PLANE |
|---|---|---|---|---|
| $L_1//x$ $n_1//x$ | $L_2//y$ $n_2//x$ | 1-1 | X-AXIS LINEAR POLARIZATION ($\theta_p=0°$) | |
| | | 1-2 | Y-AXIS LINEAR POLARIZATION ($\theta_p=90°$) | |
| | | 1-3 | ±45° LINEAR POLARIZATION ($\theta_p=±45°$), NON-POLARIZATION, OR CIRCULAR POLARIZATION | |
| | | 1-4 | $45°<\theta_p<90°$ OR $-90°<\theta_p<-45°$ LINEAR POLARIZATION | |
| | | 1-5 | $-45°<\theta_p<45°$ LINEAR POLARIZATION | |

Figure 5

| | | 2 | |
|---|---|---|---|
| FIRST LENS (LENS PITCH $W_1$) | SECOND LENS (LENS PITCH $W_2$) | POLARIZATION OF INCIDENT BEAM | OUTPUT BEAM PATTERN ON FOCAL PLANE |
| $L_1//x$ $n_1//y$ | $L_2//y$ $n_2//y$ | 2-1 X-AXIS LINEAR POLARIZATION ($\theta_p=0°$) | |
| | | 2-2 Y-AXIS LINEAR POLARIZATION ($\theta_p=90°$) | |
| | | 2-3 ±45° LINEAR POLARIZATION ($\theta_p=±45°$), NON-POLARIZATION, OR CIRCULAR POLARIZATION | |
| | | 2-4 45°<$\theta_p$<90° OR -90°<$\theta_p$<-45° LINEAR POLARIZATION | |
| | | 2-5 -45°<$\theta_p$<45° LINEAR POLARIZATION | |

Figure 6

| FIRST LENS (LENS PITCH $W_1$) | SECOND LENS (LENS PITCH $W_2$) | POLARIZATION OF INCIDENT BEAM | | OUTPUT BEAM PATTERN ON FOCAL PLANE |
|---|---|---|---|---|
| $L_1//x$ $n_1//x$ | $L_2//y$ $n_2//y$ | 3-1 | X-AXIS LINEAR POLARIZATION ($\theta_p=0°$) | 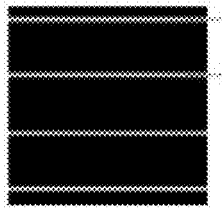 |
| | | 3-2 | Y-AXIS LINEAR POLARIZATION ($\theta_p=90°$) | 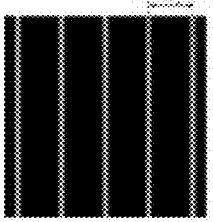 |
| | | 3-3 | ±45° LINEAR POLARIZATION ($\theta_p=±45°$), NON-POLARIZATION OR CIRCULAR POLARIZATION | 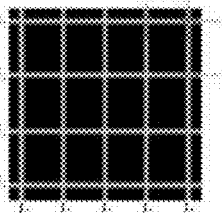 |
| | | 3-4 | $45°<\theta_p<90°$ OR $-90°<\theta_p<-45°$ LINEAR POLARIZATION | 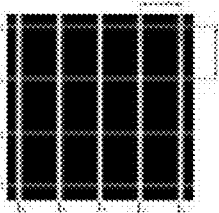 |
| | | 3-5 | $-45°<\theta_p<45°$ LINEAR POLARIZATION | 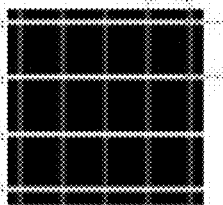 |

Figure 7

| 4 | | | | |
|---|---|---|---|---|
| FIRST LENS (LENS PITCH $W_1$) | SECOND LENS (LENS PITCH $W_2$) | | POLARIZATION OF INCIDENT BEAM | OUTPUT BEAM PATTERN ON FOCAL PLANE |
| $L_1//x$ $n_1//y$ | $L_2//y$ $n_2//x$ | 4-1 | X-AXIS LINEAR POLARIZATION ($\theta_p=0°$) | |
| | | 4-2 | Y-AXIS LINEAR POLARIZATION ($\theta_p=90°$) | |
| | | 4-3 | ±45° LINEAR POLARIZATION ($\theta_p=±45°$), NON-POLARIZATION, OR CIRCULAR POLARIZATION | |
| | | 4-4 | 45°<$\theta_p$<90° OR -90°<$\theta_p$<-45° LINEAR POLARIZATION | |
| | | 4-5 | -45°<$\theta_p$<45° LINEAR POLARIZATION | |

Figure 8

| 5 | | | |
|---|---|---|---|
| FIRST LENS (LENS PITCH $W_1$) | SECOND LENS (LENS PITCH $W_2=2W_1$) | POLARIZATION OF INCIDENT BEAM | OUTPUT BEAM PATTERN ON FOCAL PLANE |
| $L_1//x$ $n_1//x$ | $L_2//x$ $n_2//y$ | 5-1 X-AXIS LINEAR POLARIZATION ($\theta_p=0°$) | |
| | | 5-2 Y-AXIS LINEAR POLARIZATION ($\theta_p=90°$) | |
| | | 5-3 ±45° LINEAR POLARIZATION ($\theta_p=\pm45°$), NON-POLARIZATION, OR CIRCULAR POLARIZATION | |
| | | 5-4 45°<$\theta_p$<90° OR -90°<$\theta_p$<-45° LINEAR POLARIZATION | |
| | | 5-5 -45°<$\theta_p$<45° LINEAR POLARIZATION | |

Figure 9

| 6 | | | |
|---|---|---|---|
| FIRST LENS (LENS PITCH $W_1$) | SECOND LENS (LENS PITCH $W_2$=2$W_1$) | POLARIZATION OF INCIDENT BEAM | OUTPUT BEAM PATTERN ON FOCAL PLANE |
| $L_1$//x $n_1$//y | $L_2$//x $n_2$//x | 6-1 X-AXIS LINEAR POLARIZATION ($\theta_p$=0°) |  |
| | | 6-2 Y-AXIS LINEAR POLARIZATION ($\theta_p$=90°) |  |
| | | 6-3 ±45° LINEAR POLARIZATION ($\theta_p$=±45°), NON-POLARIZATION, OR CIRCULAR POLARIZATION |  |
| | | 6-4 45°<$\theta_p$<90° OR -90°<$\theta_p$<-45° LINEAR POLARIZATION | 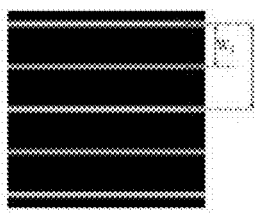 |
| | | 6-5 -45°<$\theta_p$<45° LINEAR POLARIZATION | 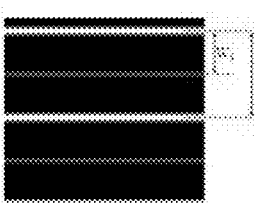 |

Figure 10

| FIRST LENS (LENS PITCH $W_1$) | SECOND LENS (LENS PITCH $W_2=2W_1$) | POLARIZATION OF INCIDENT BEAM | | OUTPUT BEAM PATTERN ON FOCAL PLANE |
|---|---|---|---|---|
| $L_1//y$ $n_1//x$ | $L_2//y$ $n_2//y$ | 7-1 | X-AXIS LINEAR POLARIZATION ($\theta_p=0°$) | 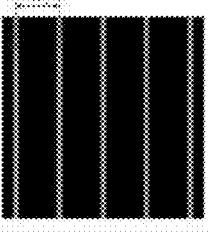 |
| | | 7-2 | Y-AXIS LINEAR POLARIZATION ($\theta_p=90°$) | 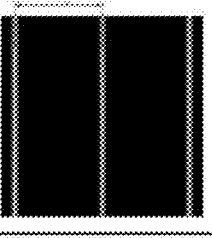 |
| | | 7-3 | ±45° LINEAR POLARIZATION ($\theta_p=±45°$), NON-POLARIZATION, OR CIRCULAR POLARIZATION | 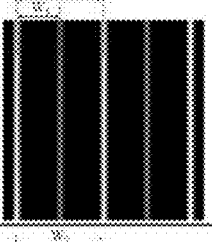 |
| | | 7-4 | $45°<\theta_p<90°$ OR $-90°<\theta_p<-45°$ LINEAR POLARIZATION | 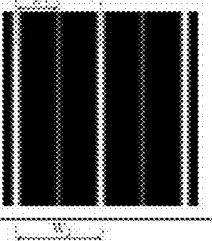 |
| | | 7-5 | $-45°<\theta_p<45°$ LINEAR POLARIZATION | 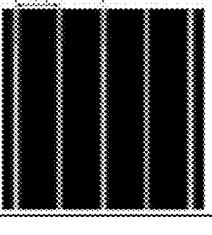 |

Figure 11

| | FIRST LENS (LENS PITCH $W_1$) | SECOND LENS (LENS PITCH $W_2=2W_1$) | | POLARIZATION OF INCIDENT BEAM | OUTPUT BEAM PATTERN ON FOCAL PLANE |
|---|---|---|---|---|---|
| 8 | | | | | |
| | $L_1//y$ $n_1//y$ | $L_2//y$ $n_2//x$ | 8-1 | X-AXIS LINEAR POLARIZATION ($\theta_p=0°$) | |
| | | | 8-2 | Y-AXIS LINEAR POLARIZATION ($\theta_p=90°$) | |
| | | | 8-3 | ±45° LINEAR POLARIZATION ($\theta_p=±45°$), NON-POLARIZATION, OR CIRCULAR POLARIZATION | |
| | | | 8-4 | $45°<\theta_p<90°$ OR $-90°<\theta_p<-45°$ LINEAR POLARIZATION | |
| | | | 8-5 | $-45°<\theta_p<45°$ LINEAR POLARIZATION | |

INCIDENT BEAM POLARIZATION DEPENDENT OPTICAL DEVICE WITH VARIABLE FOCUSING BEAM PATTERN

TECHNICAL FIELD

The present invention relates to an optical device with variable focused beam pattern and, more particularly, to an optical device with variable focused beam pattern configured by laminating two lenticular lenses arrays having a polarization-dependent focusing characteristic capable of obtaining various focused beam patterns according to a varying polarization direction of an incident beam.

BACKGROUND ART

A convex-lens-shaped lenticular lens array configured with liquid crystals or liquid crystal polymers having optical anisotropy is formed on a concave-lens-shaped transparent polymer layer. A lens function of the concave-lens-shaped lenticular lens array is determined according to a polarization direction of an incident beam. For example, in the case where a refractive index of the concave-lens-shaped polymer layer and an ordinary refractive index of the convex-lens-shaped liquid crystals or liquid crystal polymers formed on the concave-lens-shaped polymer layer are optical matched and an extraordinary refractive index of the liquid crystals or liquid crystal polymers is larger than the reproduction image of the polymer layer, when the incident beam is incident so that the polarization of the incident beam is parallel to the extraordinary refractive index axis direction, the lenticular lens array functions as a convex lens, so that light is focused to be output. However, when the polarization of the incident beam is parallel to the ordinary refractive index axis direction, the lenticular lens array does not function as a convex lens, so that light cannot be focused, and thus, the light propagates straightforward.

When the light having the polarization parallel to the extraordinary refractive index axis direction is incident on the above-described lenticular lens array, an array of focused line pattern having a directionality parallel to an axis direction of the lens array is formed at the point separated by a focal length.

The present invention is to provide an optical device with various focused beam patterns according to polarization of an incident beam using a lenticular lens array having the above characteristics.

DISCLOSURE

Technical Problem

In the case of a lens array having polarization dependency using existing liquid crystals or liquid crystal polymers, a single focused pattern is simply switched according to polarization condition of an incident beam. The present invention is to provide an optical device with variable focused beam pattern according to polarization condition of an incident beam by using a laminated lenticular lens array having polarization dependency.

Technical Solution

According to an aspect of the present invention, there is provided an optical device with variable focused beam pattern depending on polarization of an incident beam, including: a first lens structure which is configured by arranging first lenticular lenses which are formed with liquid crystals or liquid crystal polymers having a first extraordinary refractive index axis direction and of which longitudinal axes are aligned with a first alignment direction; and a second lens structure which is laminated on a beam emitting surface of the first lens structure and configured by arranging second lenticular lenses which are formed with liquid crystals or liquid crystal polymers having a second extraordinary refractive index axis direction and of which longitudinal axes are aligned with a second alignment direction, wherein a beam pattern of output light output from the second lens structure is determined according to a polarization direction of the incident beam incident on the first lens structure, the first and second extraordinary refractive index axis directions of the first and second lens structures, and the first and second alignment directions of the first and second lens structures.

In the optical device with variable focused beam pattern according to the above aspect, preferably, the first and second lens structures are designed so that focused points (focal plane) are the same.

In the optical device with variable focused beam pattern according to the above aspect, preferably, each of the first and second lens structures is configured to include: a lens layer which is configured with liquid crystals or liquid crystal polymers having optical anisotropy and has a convex lens shape; and a substrate layer which is configured with polymers having optical isotropy and has a shape reverse to the shape of the lens layer.

In addition, more preferably, the extraordinary refractive index of the lens layer is larger than a refractive index of the substrate layer, and an ordinary refractive index of the lens layer is equal to the refractive index of the substrate layer.

In the optical device with variable focused beam pattern according to the above aspect, preferably, the first alignment direction of the first lens structure and the second alignment direction of the second lens structure are equal to or perpendicular to each other. In addition, preferably, the first extraordinary refractive index axis direction of the first lens structure and the second extraordinary refractive index axis direction of the second lens structure are equal to or perpendicular to each other.

In the optical device with variable focused beam pattern according to the above aspect, preferably, in the case where the alignment directions of the longitudinal axes of the first and second lens structures are parallel to each other and the extraordinary refractive index axis directions of the first and second lens structures are perpendicular to each other, the arrangement period of the second lenticular lenses of the second lens structure is determined to be an integer multiple of the arrangement period of the first lenticular lenses of the first lens structure, or the arrangement period of the first lenticular lenses of the first lens structure is determined to be an integer multiple of the arrangement period of the second lenticular lenses of the second lens structure.

In the optical device with variable focused beam pattern according to the above aspect, preferably, the first and second lenticular lenses are configured with GRIN lenses or Fresnel lenses.

Advantageous Effects

An optical device with variable focused beam pattern according to the present invention is configured by combining alignment directions of longitudinal axes and extraordinary refractive index axis directions of the laminated first and second lens structures, and polarization of an incident beam is adjusted, so that various forms of focused beam pattern can be obtained.

In addition, in the optical device with variable focused beam pattern according to the present invention, the alignment directions of the longitudinal axes of the first and second lens arrays are disposed to be perpendicular to each other, and the extraordinary refractive index axis directions of the liquid crystals or liquid crystal polymers are disposed to be parallel to each other, so that a 2D array of focused point pattern according to polarization of an incident beam can be obtained.

In addition, in the optical device with variable focused beam pattern according to the present invention, the alignment directions of the longitudinal axes of the first and second lens arrays are disposed to be perpendicular to each other, and the extraordinary refractive index axis directions of the liquid crystals or liquid crystal polymers are disposed to be perpendicular to each other, so that an array of focused line pattern or an array of focused line checkered in the x-axis direction or the y-axis direction according to polarization of an incident beam can be obtained.

In addition, in the optical device with variable focused beam pattern according to the present invention, the alignment directions of the longitudinal axes of the first and second lens arrays are disposed to be equal to the x-axis direction or the y-axis direction, the extraordinary refractive index axis directions of the liquid crystals or liquid crystal polymers are perpendicular to each other, and the arrangement period of the second lens array is determined to be two times or an integer multiple of the arrangement period of the first lens array or the arrangement period of the first lens array is determined to be two times or an integer multiple of the arrangement period of the second lens array, so that the axis direction of an array of line pattern having different periods according to polarization of an incident beam is aligned to be equal to the alignment direction of the longitudinal axes of the lenticular lens arrays can be obtained.

DESCRIPTION OF DRAWINGS

FIG. 4 is a table listing output beam patterns on the focal plane with respect to incident polarizations in a first embodiment of the optical device with variable focused beam pattern according to the exemplary embodiment of the present invention.

FIG. 5 is a table listing output beam patterns on the focal plane with respect to incident polarizations in a second embodiment of the optical device with variable focused beam pattern according to the exemplary embodiment of the present invention.

FIG. 6 is a table listing output beam patterns on the focal plane with respect to incident polarizations in a third embodiment of the optical device with variable focused beam pattern according to the exemplary embodiment of the present invention.

FIG. 7 is a table listing output beam patterns on the focal plane with respect to incident polarizations in a fourth embodiment of the optical device with variable focused beam pattern according to the exemplary embodiment of the present invention.

FIG. 8 is a table listing output beam patterns on the focal plane with respect to incident polarizations in a fifth embodiment of the optical device with variable focused beam pattern according to the exemplary embodiment of the present invention.

FIG. 9 is a table listing output beam patterns on the focal plane with respect to incident polarizations in a sixth embodiment of the optical device with variable focused beam pattern according to the exemplary embodiment of the present invention.

FIG. 10 is a table listing output beam patterns on the focal plane with respect to incident polarizations in a seventh embodiment of the optical device with variable focused beam pattern according to the exemplary embodiment of the present invention.

FIG. 11 is a table listing output beam patterns on the focal plane with respect to incident polarizations in an eighth embodiment of the optical device with variable focused beam pattern according to the exemplary embodiment of the present invention.

BEST MODE

An optical device with variable focused beam pattern according to the present invention depending on polarization of an incident beam is configured so that first and second lens structures configured with lenticular lenses having polarization dependency are laminated. In the optical device with variable focused beam pattern, a beam pattern of output light output from the second lens structure is determined according to a polarization direction of the incident beam incident on the first lens structure, extraordinary refractive index axis directions of the first and second lens structures, and alignment directions of longitudinal axes of the first and second lens structures.

Hereinafter, a structure and operations of an optical device with variable focused beam pattern depending on polarization of an incident beam according to an exemplary embodiment of the present invention will be described in detail with reference to the attached drawings.

Figure 1:
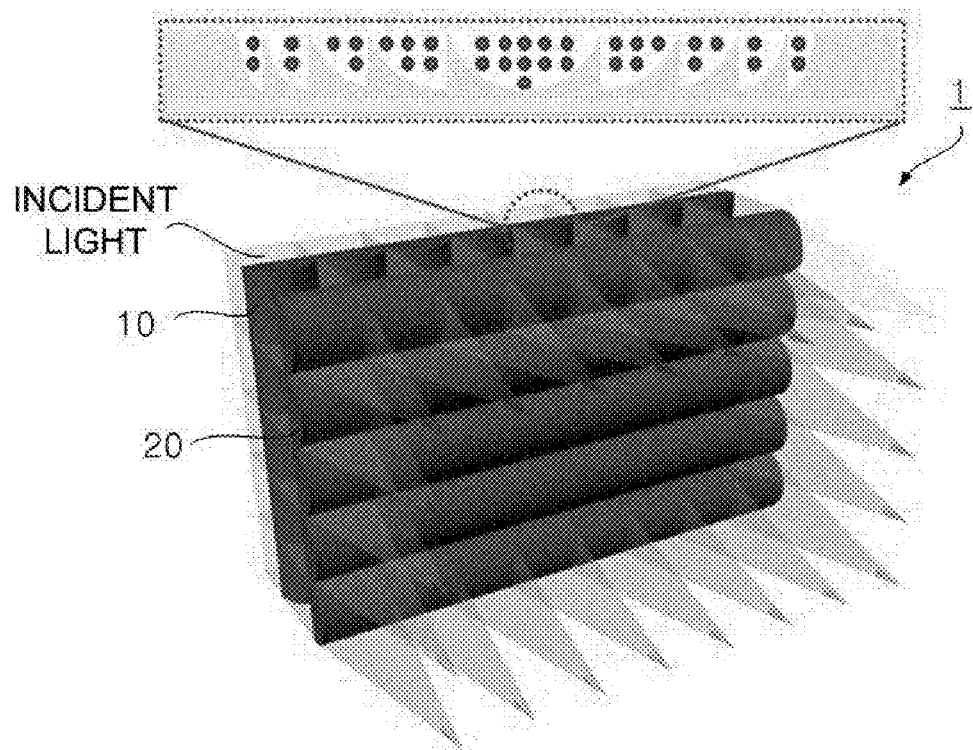
FIG. 1 is a perspective diagram illustrating a structure of an optical device with variable focused beam pattern according to an exemplary embodiment of the present invention depending on polarization of an incident beam and exemplarily illustrates an embodiment of the optical device with variable focused beam pattern where alignment directions of longitudinal axes of the first and second lens arrays are disposed to be perpendicular to each other and extraordinary refractive index axis directions of liquid crystals or liquid crystal polymers are disposed to be parallel to each other, so that a 2D array of focused point pattern according to polarization of an incident beam is formed.

FIG. 1 is a perspective diagram illustrating the structure of the optical device with variable focused beam pattern depending on polarization of an incident beam according to the exemplary embodiment of the present invention.

Referring to FIG. 1, an optical device 1 with variable focused beam pattern according to the present invention is formed so that a first lens structure 10 configured by arranging first lenticular lenses and a second lens structure 20 configured by arranging second lenticular lenses are laminated.

The first lens structure 10 is configured by arranging the first lenticular lenses which are formed with liquid crystals or liquid crystal polymers having a first extraordinary refractive index axis direction and of which longitudinal axes are aligned with a first alignment direction. The second lens structure 20 is laminated on a beam emitting surface of the first lens structure and configured by arranging the second lenticular lenses which are formed with liquid crystals or liquid crystal polymers having a second extraordinary refractive index axis direction and of which longitudinal axes are aligned with a second alignment direction.

The first and second lenticular lenses may be configured with GRIN (Graded Refractive Index) lens or Fresnel lenses. In FIG. 1 and (a) and (b) of FIG. 2, lenticular lenses configured with Fresnel lenses are exemplarily illustrated. In (c) and (d) of FIG. 2, lenticular lenses configured with GRIN lenses are exemplarily illustrated.

In the optical device with variable focused beam pattern according to the present invention having the above-described configuration, a beam pattern of light output from the second lens structure is determined according to a polarization direction of the incident beam incident on the first lens structure, the first and second extraordinary refractive index axis directions of the first and second lens structures, and the first and second alignment directions with respect to the longitudinal axes of the first and second lens structures.

The first and second lens structures are basically the same, but they are different in terms of an alignment direction of liquid crystals or liquid crystal polymers or an arrangement period according to Example.

Figure 2:
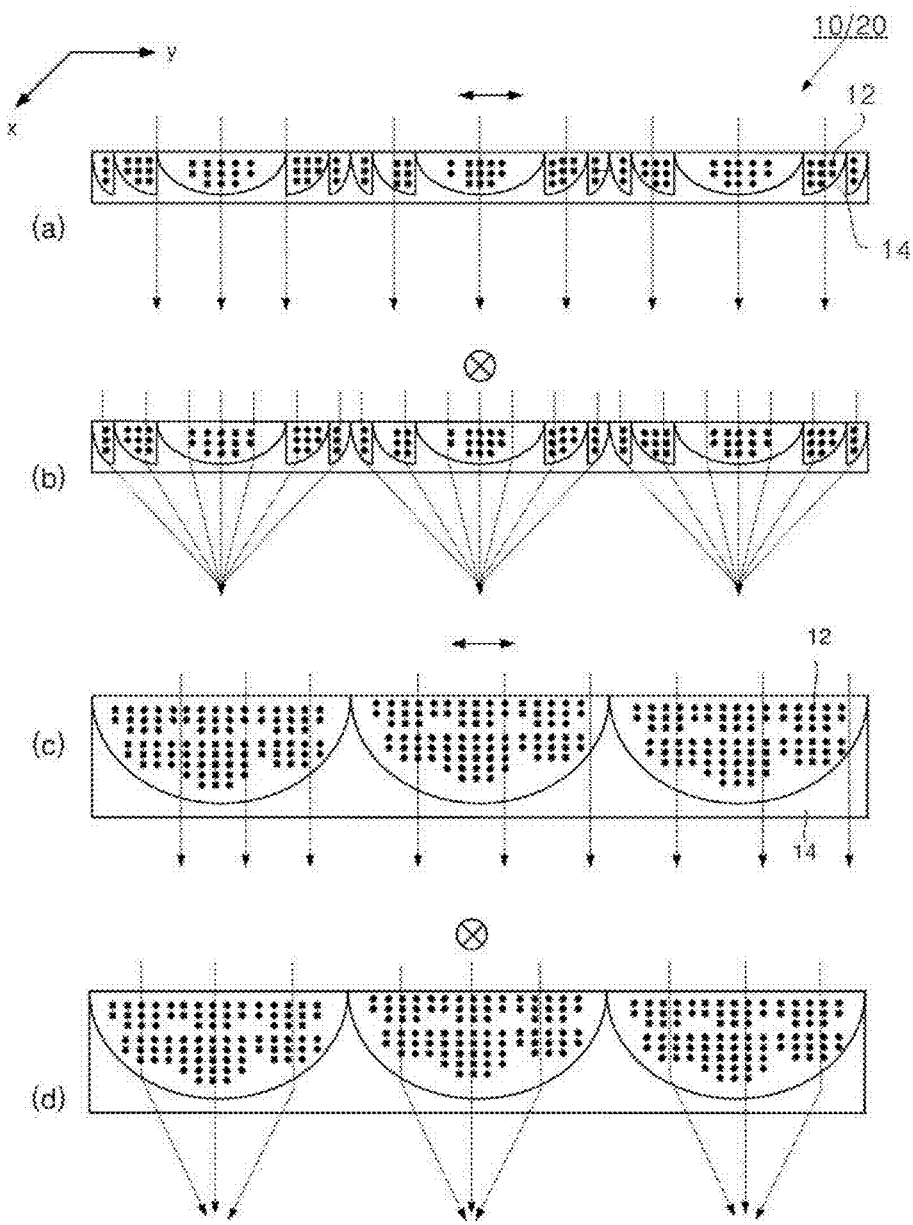
FIG. 2 is cross-sectional diagrams illustrating first and second lens structures constituting the optical device with variable focused beam pattern depending on polarization of the incident beam according to exemplary embodiments of the present invention, (a) and (b) illustrate the case where the optical device is configured with Fresnel lenses, and (c) and (d) illustrate the case where the optical device is configured with GRIN lenses.

FIG. 2 is cross-sectional diagrams illustrating first and second lens structures constituting the optical device with variable focused beam pattern depending on polarization of the incident beam according to exemplary embodiments of the present invention, (a) and (b) illustrate the case where the optical device is configured with Fresnel lenses, and (c) and (d) illustrate the case where the optical device is configured with GRIN lenses.

Referring to FIG. 2, each of the first and second lens structures 10 and 20 of the optical device with variable focused beam pattern according to the present invention is configured to include a lens layer of which one surface has a convex lens shape and a substrate layer 14 of which one surface has a shape reverse to the shape of the lens layer. The lens layer 12 is configured with liquid crystals or liquid crystal polymers having optical anisotropy, and the substrate layer 14 is configured with polymers having optical isotropy.

(a) and (b) of FIG. 2 illustrate the case where polarization in the direction equal to the ordinary refractive index axis direction is incident on the lens structure configured with Fresnel lenses and the case where polarization in the direction equal to the extraordinary refractive index axis direction is incident, respectively. (c) and (d) of FIG. 2 illustrate the case where polarization in the direction equal to the ordinary refractive index axis direction is incident on the lens structure configured with GRIN lenses and the case where polarization in the direction equal to the extraordinary refractive index axis direction is incident, respectively.

In the case where the lens layer is configured with liquid crystals, alignment layers may be further formed above and under the liquid crystals. In the case where the lens layer is configured with liquid crystal polymers, an alignment layer may be formed on only the interface between the liquid crystal polymers and the substrate layer, or without additional alignment layer, alignment may be performed through a light curing process.

Preferably, the extraordinary refractive index $n_e$ of the liquid crystals or liquid crystal polymers of the lens layer is larger than the refractive index $n_p$ of the isotropic polymers of the substrate layer ($n_e > n_p$), and the ordinary refractive index $n_o$ of the liquid crystals or liquid crystal polymers of the lens layer is equal to the refractive index $n_p$ of the isotropic polymers of the substrate layer so that optical refractive index matching is maintained ($n_o = n_p$).

Therefore, as illustrated in (b) and (d) of FIG. 2, in the case where the polarization of the light incident on the first or second lens structure is parallel to the extraordinary refractive index axis direction, the light is focused due to the convex lens effect. In this case, the light beams passing through the first or second lens structure configured with the lenticular lenses having polarization dependency form an array of focused line pattern having directionality parallel to the alignment direction L of the lenticular lenses at a position separated by a focal length.

On the other hand, as illustrated in (a) and (c) of FIG. 2, in the case where the polarization of the light incident on the first or second lens structure is parallel to the ordinary refractive index axis direction, since there is no convex lens effect, the light is not focused, and the light propagates straightforward.

In the optical device with variable focused beam pattern according to the present invention, the first and second lens structures having the above-described configuration are laminated, and with respect to the laminated first and second lens structures, the incident beam firstly transmits the first lens structure and, after that, transmits the second lens structure.

The first and second lens structures are designed so that the focused points (focal plane) are the same, and thus, the beam pattern of the output light is formed on one focal plane. Namely, a focal length of the second lens structure needs to be smaller than a focal length of the first lens structure.

Preferably, a first alignment direction of the first lens structure and a second alignment direction of the second lens structure are equal to each other or perpendicular to each other. In addition, preferably, a first extraordinary refractive index axis direction of the first lens structure and a second extraordinary refractive index axis direction of the second lens structure are equal to each other or perpendicular to each other. In addition, preferably, the axis directions and the extraordinary refractive index axis directions of the first and second lens structures are equal to each other or perpendicular to each other.

In addition, preferably, in the case where the alignment directions of the longitudinal axes of the first and second lens structures are equal to each other and the extraordinary refractive index axis directions of the first and second lens structures are perpendicular to each other, an arrangement period of the second lenticular lenses of the second lens structure is determined to be an integer multiple of an arrangement period of the first lenticular lenses of the first lens structure, or an arrangement period of the first lenticular lenses of the first lens structure is determined to be an integer multiple of an arrangement period of the second lenticular lenses of the second lens structure.

The optical device with variable focused beam pattern according to the present invention having the above-described configuration can be designed variously according to combinations of the alignment direction and the extraordinary refractive index axis direction of the first and second lens structures, and various beam patterns can be output according to the combinations.

Mode for Invention

Figure 3:
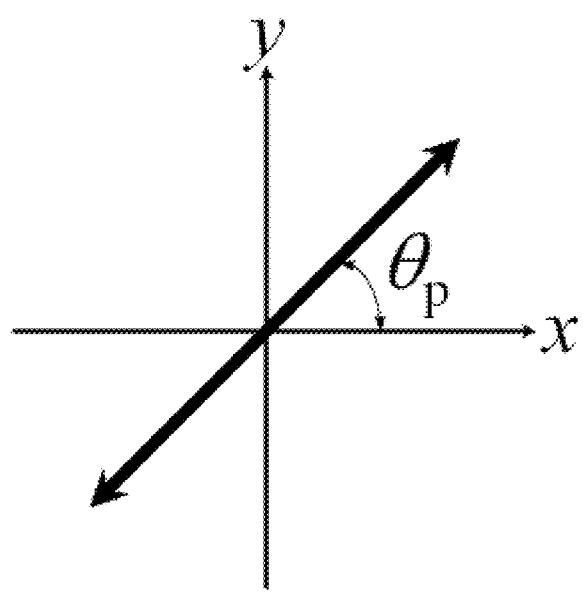
FIG. 3 is a diagram illustrating a coordinate system indicating a polarization angle $\theta_p$ of an incident beam.

Hereinafter, with reference to FIGS. 3 to 11, embodiments of the optical device with variable focused beam pattern according to the present invention which can be designed variously according to the combinations of the alignment direction and the extraordinary refractive index axis direction of the first and second lens structures and the combinations of the arrangement periods will be described, and the beam patterns output according to the incident polarization will be described. Herein, the above-described of the lenticular lens is denoted by L, the extraordinary refractive index axis direction is denoted by n, the arrangement period of the lens is denoted by W, the first lens structure is denoted by 1, and the second lens structure is denoted by 2. Herein, the first and second lens structures are disposed on the x-y plane, and the light propagates along the z axis. In the case where the light incident on the first and second lens structures is linearly-polarized light, a polarization angle $\theta_p$ is defined as illustrated in FIG. 3.

First Embodiment

FIG. 4 is a table listing output beam patterns on the focal plane with respect to incident polarization in a first embodiment of the optical device with variable focused beam pattern according to the exemplary embodiment of the present invention.

Referring to FIG. 4, the optical device according to the first embodiment is configured so that the alignment direction $L_1$ of the lenticular lenses of the first lens structure is parallel to the x-axis direction ($L_1\|x$), the extraordinary refractive index axis direction $n_1$ of the liquid crystals or liquid crystal polymers of the first lens structure is parallel to the x-axis direction ($n_1\|x$), the alignment direction $L_2$ of the lenticular lenses of the second lens structure is parallel to the y-axis direction ($L_2\|y$), the extraordinary refractive index axis direction $n_2$ of the liquid crystals or liquid crystal polymers of the second lens structure is parallel to the x-axis direction ($n_2\|x$), the axis directions of the first and second lens structures are perpendicular to each other ($L_1\perp L_2$), and the extraordinary refractive index axis directions are parallel to each other ($n_1\|n_2$). In addition, the first lens structure has an arrangement period $W_1$, and the second lens structure has an arrangement period $W_2$.

In the optical device with variable focused beam pattern according to the first embodiment, in the case where the incident polarization is x-axis linear polarization ($\theta_p=0°$), the output beam pattern on the focal plane is formed as a 2D array of focused point pattern (Example 1-1). In this case, the x-axis period of the 2D array of focused point pattern is in accordance with the arrangement period $W_2$ of the second lens structure, and the y-axis period is in accordance with the arrangement period $W_1$ of the first lens structure.

In the case where the incident polarization is y-axis linear polarization ($\theta_p=90°$), the output beam pattern on the focal plane is formed as a non-focused incident beam pattern (Example 1-2).

In the case where the incident polarization is ±45-degree linear polarization ($\theta_p=\pm 45°$), non-polarization, or circular polarization, the output beam pattern on the focal plane is formed as a 2D array of focused point pattern having an average light intensity of the output beam pattern (1-1) according to the x-axis linear polarization and the output beam pattern (1-2) according to the y-axis linear polarization (Example 1-3). In this case, the x-axis period of the 2D array of focused point pattern is in accordance with the arrangement period $W_2$ of the second lens structure, and the y-axis period is in accordance with the arrangement period $W_1$ of the first lens structure.

In the case where the incident linear polarization has a polarization angle of $45°<\theta_p<90°$ or $-90°<\theta_p<-45°$, the output beam pattern on the focal plane is formed as a 2D array of point pattern having a degree of focusing lower than that of the output beam pattern (1-3) (Example 1-4). In this case, the x-axis period of the 2D array of focused point pattern is in accordance with the arrangement period $W_2$ of the second lens structure, and the y-axis period is in accordance with the arrangement period $W_1$ of the first lens structure.

In the case where the incident linear polarization has a polarization angle of $-45°<\theta_p<45°$, the output beam pattern on the focal plane is formed as a 2D array of point pattern having a degree of focusing higher than that of the output beam pattern (1-3) (Example 1-5). In this case, the x-axis period of the 2D array of focused point pattern is accordance with the arrangement period $W_2$ of the second lens structure, and the y-axis period is accordance with the arrangement period $W_1$ of the first lens structure.

Second Embodiment

FIG. 5 is a table listing output beam patterns on the focal plane with respect to incident polarization in a second embodiment of the optical device with variable focused beam pattern according to the exemplary embodiment of the present invention.

Referring to FIG. 5, the optical device according to the second embodiment is configured so that the alignment direction $L_1$ of the lenticular lenses of the first lens structure is parallel to the x-axis direction ($L_1\|x$), the extraordinary refractive index axis direction $n_1$ of the liquid crystals or liquid crystal polymers of the first lens structure is parallel to the y-axis direction ($n_1\|y$), the alignment direction $L_2$ of the lenticular lenses of the second lens structure is parallel to the y-axis direction ($L_2\|y$), the extraordinary refractive index axis direction $n_2$ of the liquid crystals or liquid crystal polymers of the second lens structure is parallel to the y-axis direction ($n_2\|y$), the axis directions of the first and second lens structures are perpendicular to each other ($L_1\perp L_2$), and the extraordinary refractive index axis directions are parallel to each other ($n_1\|n_2$). In addition, the first lens structure has an arrangement period $W_1$, and the second lens structure has an arrangement period $W_2$.

In the optical device with variable focused beam pattern according to the second embodiment, in the case where the incident polarization is x-axis linear polarization ($\theta_p=0°$), the output beam pattern on the focal plane is formed as a non-focused focus incident beam pattern and is the same as the output beam pattern (1-2) (Example 2-1).

In the case where the incident polarization is y-axis linear polarization ($\theta_p=90°$), the output beam pattern on the focal plane is formed as a 2D array of focused point pattern and is the same as the output beam pattern (1-1) (Example 2-2).

In the case where the incident polarization is ±45-degree linear polarization ($\theta_p=\pm 45°$), non-polarization, or circular polarization, the output beam pattern on the focal plane is formed as a 2D array of focused point pattern having an average light intensity of the output beam pattern (2-1) according to the x-axis linear polarization and the output beam pattern (2-2) according to the y-axis linear polarization and is the same as the output beam pattern (1-3) (Example 2-3).

In the case where the incident linear polarization has a polarization angle of $45°<\theta_p<90°$ or $-90°<\theta_p<-45°$, the output beam pattern on the focal plane is formed as a 2D array of point pattern having a degree of focusing higher than that of the output beam pattern (2-3) and is the same as that of the output beam pattern (1-5) (Example 2-4).

In the case where the incident linear polarization has a polarization angle of $-45°<\theta_p<45°$, the output beam pattern on the focal plane is formed as a 2D array of point pattern having a degree of focusing lower than that of the output beam pattern (2-3) and is the same as that of the output beam pattern (1-4) (Example 2-5).

Third Embodiment

FIG. 6 is a table listing output beam patterns on the focal plane with respect to incident polarization in a third embodiment of the optical device with variable focused beam pattern according to the exemplary embodiment of the present invention.

Referring to FIG. 6, the optical device according to the third embodiment is configured so that the alignment direction $L_1$ of the lenticular lenses of the first lens structure is parallel to the x-axis direction ($L_1 \| x$), the extraordinary refractive index axis direction $n_1$ of the liquid crystals or liquid crystal polymers of the first lens structure is parallel to the x-axis direction ($n_1 \| x$), the alignment direction $L_2$ of the lenticular lenses of the second lens structure is parallel to the y-axis direction ($L_2 \| y$), the extraordinary refractive index axis direction $n_2$ of the liquid crystals or liquid crystal polymers of the second lens structure is parallel to the y-axis direction ($n_2 \| y$), the axis directions of the first and second lens structures are perpendicular to each other ($L_1 \perp L_2$), and the extraordinary refractive index axis directions are perpendicular to each other ($n_1 \perp n_2$). In addition, the first lens structure has an arrangement period $W_1$, and the second lens structure has an arrangement period $W_2$.

In the optical device with variable focused beam pattern according to the third embodiment, in the case where the incident polarization is x-axis linear polarization ($\theta_p=0°$), the output beam pattern on the focal plane is formed as an array of focused line pattern in the x-axis direction (Example 3-1). In this case, the period of the array of focused line pattern is in accordance with the arrangement period $W_1$ of the first lens structure.

In the case where the incident polarization is y-axis linear polarization ($\theta_p=90°$), the output beam pattern on the focal plane is formed as an array of focused line pattern in the y-axis direction (Example 3-2). In this case, the period of the array of focused line pattern is in accordance with the arrangement period $W_2$ of the second lens structure.

In the case where the incident polarization is ±45-degree linear polarization ($\theta_p=\pm45°$), non-polarization, or circular polarization, the output beam pattern on the focal plane is formed as an array of focused line checkered pattern having an average light intensity of the output beam pattern (3-1) according to the x-axis linear polarization and the output beam pattern (3-2) according to the y-axis linear polarization. In this case, the degree of focusing ($l_1$) of the array of line pattern in the x-axis direction ($l_1$) and the degree of focusing ($l_2$) of the array of line pattern in the y-axis direction ($l_2$) are equal to each other (Example 3-3). In addition, the period of the array of line pattern in the x-axis direction is in accordance with the arrangement period $W_1$ of the first lens structure, and the period of the array of line pattern in the y-axis direction is in accordance with the arrangement period $W_2$ of the second lens structure.

In the case where the incident linear polarization has a polarization angle of $45°<\theta_p<90°$ or $-90°<\theta_p<-45°$, the output beam pattern on the focal plane is formed as an array of focused line checkered pattern, and at this time, the degree of focusing ($l_1$) of the array of line pattern in the x-axis direction is weakened in comparison with the output beam pattern (3-3), and the degree of focusing ($l_2$) of the array of line pattern in the y-axis direction ($l_2$) is strengthened in comparison with the output beam pattern (3-3) ($l_1<l_2$) (Example 3-4). In addition, the period of the array of line pattern in the x-axis direction is in accordance with the arrangement period $W_1$ of the first lens structure, and the period of the array of line pattern in the y-axis direction is in accordance with the arrangement period $W_2$ of the second lens structure.

In the case where the incident linear polarization has a polarization angle of $-45°<\theta_p<45°$, the output beam pattern on the focal plane is formed as an array of focused line checkered pattern. In this case, the degree of focusing ($l_1$) of the array of line pattern in the x-axis direction is strengthened in comparison with the output beam pattern (3-3), and the degree of focusing ($l_2$) of the array of line pattern in the x-axis direction is weakened in comparison with the output beam pattern (3-3) ($l_1>l_2$) (Example 3-5). In addition, the period of the array of line pattern in the x-axis direction is in accordance with the arrangement period $W_1$ of the first lens structure, and the period of the array of line pattern in the y-axis direction is in accordance with the arrangement period $W_2$ of the second lens structure.

Fourth Embodiment

FIG. 7 is a table listing output beam patterns on the focal plane with respect to incident polarization in a fourth embodiment of the optical device with variable focused beam pattern according to the exemplary embodiment of the present invention.

Referring to FIG. 7, the optical device according to the fourth embodiment is configured so that the alignment direction $L_1$ of the lenticular lenses of the first lens structure is parallel to the x-axis direction ($L_1 \| x$), the extraordinary refractive index axis direction $n_1$ of the liquid crystals or liquid crystal polymers of the first lens structure is parallel to the y-axis direction ($n_1 \| y$), the alignment direction $L_2$ of the lenticular lenses of the second lens structure is parallel to the y-axis direction ($L_2 \| y$), the extraordinary refractive index axis direction $n_2$ of the liquid crystals or liquid crystal polymers of the second lens structure is parallel to the x-axis direction ($n_2 \| x$), the axis directions of the first and second lens structures are perpendicular to each other ($L_1 \perp L_2$), and the extraordinary refractive index axis directions are perpendicular to each other ($n_1 \perp n_2$). In addition, the first lens structure has an arrangement period $W_1$, and the second lens structure has an arrangement period $W_2$.

In the optical device with variable focused beam pattern according to the fourth embodiment, in the case where the incident polarization is x-axis linear polarization ($\theta_p=0°$), the output beam pattern on the focal plane is formed as an array of focused line pattern in the y-axis direction (Example 4-1). In this case, the period of the array of focused line pattern is in accordance with the arrangement period $W_2$ of the second lens structure.

In the case where the incident polarization is y-axis linear polarization ($\theta_p=90°$), the output beam pattern on the focal plane is formed as an array of focused line pattern in the x-axis direction (Example 4-2). In this case, the period of the array of focused line pattern is in accordance with the arrangement period $W_1$ of the first lens structure.

In the case where the incident polarization is ±45-degree linear polarization ($\theta_p=\pm45°$), non-polarization, or circular polarization, the output beam pattern on the focal plane is formed as an array of focused line checkered pattern having an average light intensity of the output beam pattern (4-1)

according to the x-axis linear polarization and the output beam pattern (4-2) according to the y-axis linear polarization. In this case, the degree of focusing ($l_1$) of the array of line pattern in the x-axis direction and the degree of focusing ($l_2$) of the array of line pattern in the x-axis direction are equal to each other (Example 4-3). In addition, the period of the array of line pattern in the x-axis direction is in accordance with the arrangement period $W_1$ of the first lens structure, and the period of the array of line pattern in the y-axis direction is in accordance with the arrangement period $W_2$ of the second lens structure.

In the case where the incident linear polarization has a polarization angle of $45°<\theta_p<90°$ or $-90°<\theta_p<-45°$, the output beam pattern on the focal plane is formed as an array of focused line checkered pattern. In this case, the degree of focusing ($l_2$) of the array of line pattern in the x-axis direction is weakened in comparison with the output beam pattern (4-3), and the degree of focusing ($l_1$) of the array of line pattern in the x-axis direction is strengthened in comparison with the output beam pattern (4-3) ($l_1>l_2$) (Example 4-4). In addition, the period of the array of line pattern in the x-axis direction is in accordance with the arrangement period $W_1$ of the first lens structure, and the period of the array of line pattern in the y-axis direction is in accordance with the arrangement period $W_2$ of the second lens structure.

In the case where the incident linear polarization has a polarization angle of $-45°<\theta_p<45°$, the output beam pattern on the focal plane is formed as an array of focused line checkered pattern. In this case, the degree of focusing ($l_1$) of the array of line pattern in the x-axis direction is weakened in comparison with the output beam pattern (4-3), and the degree of focusing ($l_2$) of the array of line pattern in the x-axis direction is strengthened in comparison with the output beam pattern (4-3) ($l_1<l_2$) (Example 4-5). In addition, the period of the array of line pattern in the x-axis direction is in accordance with the arrangement period $W_1$ of the first lens structure, and the period of the array of line pattern in the y-axis direction is in accordance with the arrangement period $W_2$ of the second lens structure.

Fifth Embodiment

FIG. 8 is a table listing output beam patterns on the focal plane with respect to incident polarization in a fifth embodiment of the optical device with variable focused beam pattern according to the exemplary embodiment of the present invention.

Referring to FIG. 8, the optical device according to the fifth embodiment is configured so that the alignment direction $L_1$ of the lenticular lenses of the first lens structure is parallel to the x-axis direction ($L_1\|x$), the extraordinary refractive index axis direction $n_1$ of the liquid crystals or liquid crystal polymers of the first lens structure is parallel to the x-axis direction ($n_1\|x$), the alignment direction $L_2$ of the lenticular lenses of the second lens structure is parallel to the x-axis direction ($L_2\|x$), the extraordinary refractive index axis direction $n_2$ of the liquid crystals or liquid crystal polymers of the second lens structure is parallel to the y-axis direction ($n_2\|y$), the axis directions of the first and second lens structures are parallel to each other ($L_1\|L_2$), and the extraordinary refractive index axis directions are perpendicular to each other ($n_1 \perp n_2$). In addition, the arrangement period $W_2$ of the second lens structure may be two times or an integer multiple of the arrangement period $W_1$ of the first lens structure, or the arrangement period $W_1$ of the first lens structure may be two times or an integer multiple of the arrangement period $W_2$ of the second lens structure. In the embodiment, particularly, the case of the condition $W_2=2W_1$ is exemplarily described. In this case, the first and second lens structures are disposed so that the periods thereof are coherent with each other.

In the optical device with variable focused beam pattern according to the fifth embodiment, in the case where the incident polarization is x-axis linear polarization ($\theta_p=0°$), the output beam pattern on the focal plane is formed as an array of focused line pattern having a period $W_1$ in the x-axis direction (Example 5-1).

In the case where the incident polarization is y-axis linear polarization ($\theta_p=90°$), the output beam pattern on the focal plane is formed as an array of focused line pattern having a period $W_2$ in the x-axis direction (Example 5-2).

In the case where the incident polarization is ±45-degree linear polarization ($\theta_p=\pm45°$), non-polarization, or circular polarization, the output beam pattern on the focal plane is formed as an array of line pattern having an average light intensity of the output beam pattern (5-1) according to the x-axis linear polarization and the output beam pattern (5-2) according to the y-axis linear polarization (Example 5-3).

In the case where the incident linear polarization has a polarization angle of $45°<\theta_p<90°$ or $-90°<\theta_p<-45°$, the output beam pattern on the focal plane is formed as a line pattern having a period $W_2$ of which the degree of focusing is strengthened in comparison with the output beam pattern (5-3) (Example 5-4).

In the case where the incident linear polarization has a polarization angle of $-45°<\theta_p<45°$, the output beam pattern on the focal plane is formed as a line pattern having a period $W_2$ of which the degree of focusing is weakened in comparison with the output beam pattern (5-3) (Example 5-5).

Sixth Embodiment

FIG. 9 is a table listing output beam patterns on the focal plane with respect to incident polarization in a sixth embodiment of the optical device with variable focused beam pattern according to the exemplary embodiment of the present invention.

Referring to FIG. 9, the optical device according to the sixth embodiment is configured so that the alignment direction $L_1$ of the lenticular lenses of the first lens structure is parallel to the x-axis direction ($L_1\|x$), the extraordinary refractive index axis direction $n_1$ of the liquid crystals or liquid crystal polymers of the first lens structure is parallel to the y-axis direction ($n_1\|y$), the alignment direction $L_2$ of the lenticular lenses of the second lens structure is parallel to the x-axis direction ($L_2\|x$), the extraordinary refractive index axis direction $n_2$ of the liquid crystals or liquid crystal polymers of the second lens structure is parallel to the x-axis direction ($n_2\|x$), the axis directions of the first and second lens structures are parallel to each other ($L_1\|L_2$), and the extraordinary refractive index axis directions are perpendicular to each other ($n_1 \perp n_2$). In addition, the arrangement period $W_2$ of the second lens structure may be two times or an integer multiple of the arrangement period $W_1$ of the first lens structure, or the arrangement period $W_1$ of the first lens structure may be two times or an integer multiple of the arrangement period $W_2$ of the second lens structure. In the embodiment, particularly, the case of the condition $W_2=2W_1$ is exemplarily described. In this case, the first and second lens structures are disposed so that the periods thereof are coherent with each other.

In the optical device with variable focused beam pattern according to the sixth embodiment, in the case where the incident polarization is x-axis linear polarization ($\theta_p=0°$), the output beam pattern on the focal plane is formed as an array of focused line pattern having a period $W_2$ in the x-axis direction (Example 6-1).

In the case where the incident polarization is y-axis linear polarization ($\theta_p=90°$), the output beam pattern on the focal plane is formed as an array of focused line pattern having a period $W_1$ in the x-axis direction (Example 6-2).

In the case where the incident polarization is ±45-degree linear polarization ($\theta_p=\pm 45°$), non-polarization, or circular polarization, the output beam pattern on the focal plane is formed as an array of line pattern having an average light intensity of the output beam pattern (6-1) according to the x-axis linear polarization and the output beam pattern (6-2) according to the y-axis linear polarization (Example 6-3).

In the case where the incident linear polarization has a polarization angle of $45°<\theta_p<90°$ or $-90°<\theta_p<-45°$, the output beam pattern on the focal plane is formed as a line pattern having a period $W_2$ of which the degree of focusing is weakened in comparison with the output beam pattern (6-3) (Example 6-4).

In the case where the incident linear polarization has a polarization angle of $-45°<\theta_p<45°$, the output beam pattern on the focal plane is formed as a line pattern having a period $W_2$ of which the degree of focusing is strengthened in comparison with the output beam pattern (6-3) (Example 6-5).

Seventh Embodiment

FIG. 10 is a table listing output beam patterns on the focal plane with respect to incident polarization in a seventh embodiment of the optical device with variable focused beam pattern according to the exemplary embodiment of the present invention.

Referring to FIG. 10, the optical device according to the seventh embodiment is configured so that the alignment direction $L_1$ of the lenticular lenses of the first lens structure is parallel to the y-axis direction ($L_1 \| y$), the extraordinary refractive index axis direction $n_1$ of the liquid crystals or liquid crystal polymers of the first lens structure is parallel to the x-axis direction ($n_1 \| x$), the alignment direction $L_2$ of the lenticular lenses of the second lens structure is parallel to the y-axis direction ($L_2 \| y$), the extraordinary refractive index axis direction $n_2$ of the liquid crystals or liquid crystal polymers of the second lens structure is parallel to the y-axis direction ($n_2 \| y$), the axis directions of the first and second lens structures are parallel to each other ($L_1 \| L_2$), and the extraordinary refractive index axis directions are perpendicular to each other ($n_1 \perp n_2$). In addition, the arrangement period $W_2$ of the second lens structure may be two times or an integer multiple of the arrangement period $W_1$ of the first lens structure, or the arrangement period $W_1$ of the first lens structure may be two times or an integer multiple of the arrangement period $W_2$ of the second lens structure. In the embodiment, particularly, the case of the condition $W_2=2W_1$ is exemplarily described. In this case, the first and second lens structures are disposed so that the periods thereof are coherent with each other.

In the optical device with variable focused beam pattern according to the seventh embodiment, in the case where the incident polarization is x-axis linear polarization ($\theta_p=0°$), the output beam pattern on the focal plane is formed as an array of focused line pattern having a period $W_1$ in the y-axis direction (Example 7-1).

In the case where the incident polarization is y-axis linear polarization ($\theta_p=90°$), the output beam pattern on the focal plane is formed as an array of focused line pattern having a period $W_2$ in the y-axis direction (Example 7-2).

In the case where the incident polarization is ±45-degree linear polarization ($\theta_p=\pm 45°$), non-polarization, or circular polarization, the output beam pattern on the focal plane is formed as an array of line pattern having an average light intensity of the output beam pattern (7-1) according to the x-axis linear polarization and the output beam pattern (7-2) according to the y-axis linear polarization (Example 7-3).

In the case where the incident linear polarization has a polarization angle of $45°<\theta_p<90°$ or $-90°<\theta_p<-45°$, the output beam pattern on the focal plane is formed as a line pattern having a period $W_2$ of which the degree of focusing is strengthened in comparison with the output beam pattern (7-3) (Example 7-4).

In the case where the incident linear polarization has a polarization angle of $-45°<\theta_p<45°$, the output beam pattern on the focal plane is formed as a line pattern having a period $W_2$ of which the degree of focusing is weakened in comparison with the output beam pattern (7-3) (Example 7-5).

Eighth Embodiment

FIG. 11 is a table listing output beam patterns on the focal plane with respect to incident polarization in an eighth embodiment of the optical device with variable focused beam pattern according to the exemplary embodiment of the present invention.

Referring to FIG. 11, the optical device according to the eighth embodiment is configured so that the alignment direction $L_1$ of the lenticular lenses of the first lens structure is parallel to the y-axis direction ($L_1 \| y$), the extraordinary refractive index axis direction $n_1$ of the liquid crystals or liquid crystal polymers of the first lens structure is parallel to the y-axis direction ($n_1 \| y$), the alignment direction $L_2$ of the lenticular lenses of the second lens structure is parallel to the y-axis direction ($L_2 \| y$), the extraordinary refractive index axis direction $n_2$ of the liquid crystals or liquid crystal polymers of the second lens structure is parallel to the x-axis direction ($n_2 \| x$), the axis directions of the first and second lens structures are parallel to each other ($L_1 \| L_2$), and the extraordinary refractive index axis directions are perpendicular to each other ($n_1 \perp n_2$). In addition, the arrangement period $W_2$ of the second lens structure may be two times or an integer multiple of the arrangement period $W_1$ of the first lens structure, or the arrangement period $W_1$ of the first lens structure may be two times or an integer multiple of the arrangement period $W_2$ of the second lens structure. In the embodiment, particularly, the case of the condition $W_2=2W_1$ is exemplarily described. In this case, the first and second lens structures are disposed so that the periods thereof are coherent with each other.

In the optical device with variable focused beam pattern according to the eighth embodiment, in the case where the incident polarization is x-axis linear polarization ($\theta_p=0°$), the output beam pattern on the focal plane is formed as an array of focused line pattern having a period $W_2$ in the y-axis direction (Example 8-1).

In the case where the incident polarization is y-axis linear polarization ($\theta_p=90°$), the output beam pattern on the focal plane is formed as an array of focused line pattern having a period $W_1$ in the y-axis direction (Example 8-2).

In the case where the incident polarization is ±45-degree linear polarization ($\theta_p=\pm 45°$), non-polarization, or circular polarization, the output beam pattern on the focal plane is formed as an array of line pattern having an average light intensity of the output beam pattern (8-1) according to the x-axis linear polarization and the output beam pattern (8-2) according to the y-axis linear polarization (Example 8-3).

In the case where the incident linear polarization has a polarization angle of $45°<\theta_p<90°$ or $-90°<\theta_p<-45°$, the output beam pattern on the focal plane is formed as a line pattern having a period $W_2$ of which the degree of focusing is weakened in comparison with the output beam pattern (8-3) (Example 8-4).

In the case where the incident linear polarization has a polarization angle of $-45°<\theta_p<45°$, the output beam pattern on the focal plane is formed as a line pattern having a period $W_2$ of which the degree of focusing is strengthened in comparison with the output beam pattern (8-3) (Example 8-5).

Applications

As described heretofore, an optical device with variable focused beam pattern according to the present invention is configured by combining alignment directions of longitudinal axes and extraordinary refractive index axis directions of the laminated first and second lens structures, and polarization of an incident beam is adjusted, so that it is possible to obtain various forms of focused beam pattern. Hereinafter, applications of the various embodiments of the optical device with variable focused beam pattern according to the present invention will be described.

First, in the optical device with variable focused beam pattern according to the present invention, since various beam patterns can be obtained according to the polarization of the incident beam, a degree of polarization of the incident beam can be measured by analyzing the beam pattern of the output light, and thus, by using this characteristic, the oblique direction can be applied to a polarization measuring apparatus. In the case of the optical devices with variable focused beam pattern according to the first and second embodiments, since a ratio of the focused intensity to the background intensity in the output beam pattern varies with the polarization of the incident beam, by using this characteristic, the polarization of the incident beam can be measured. In the case of the optical devices with variable focused beam pattern according to the third and fourth embodiments, since the degrees of focusing (intensities) of the x-axis focused beam pattern and the y-axis focused beam pattern vary with the polarization of the incident beam, by using this characteristic, the polarization of the incident beam can be measured. In the case of the optical devices with variable focused beam pattern according to the fifth to eighth embodiments, the period of the intensity of the focused beam pattern varies with the polarization of the incident beam, by using this characteristic, the polarization of the incident beam cam be measured. For example, in the optical device with variable focused beam pattern according to the fifth embodiment, when x-axis linear polarization is incident, a pattern having a period $W_1$ is formed, and when a y-axis linear polarization is incident, a pattern having a period $W_2$ (=$2W_1$) is formed. In this case, by developing a spatial pattern of focused intensity in Fourier series, intensities of spatial frequency components corresponding to intensity periods are calculated. In the case of other polarizations, a ratio of the component of the period $W_1$ and the component of the period $W_2$ (=$2W_1$) is extracted by performing spatially Fourier Transform on the focused beam pattern, so that the polarization of the incident beam can be measured.

The optical devices with variable focused beam pattern according to the present invention according to the third and fourth embodiments can be used as a screen vertical/horizontal converter of a glasses-free 3D display apparatus using a parallax of two eyes. In the optical device with variable focused beam pattern according to the third and fourth embodiments, an array of focused line pattern in the x-axis direction or the y-axis direction is output according to the polarization of the incident beam. Therefore, in the case where the optical device with variable focused beam pattern is applied to a display apparatus, by changing the polarization of the incident beam incident on the optical device according to the alignment direction of the display apparatus, one of the vertical and horizontal beam patterns is allowed to be selectively output, and thus, the parallel forming direction can be switched between the horizontal and vertical directions, so that a 3D screen can be automatically rotated.

In addition, the optical devices with variable focused beam pattern according to the present invention according to the third to eighth embodiments can be applied to a beam pattern forming apparatus. A beam pattern having a regular period is irradiated on a surface of a measurement target, and a degree of distortion of the beam pattern according to a topology is measured, so that 3D topology of the surface can be measured in a non-contact method. In this case, in order to improve an accuracy of the 3D topology measurement, instead of a single beam pattern, multiple regular beam patterns are required.

In an optical 3D topology measurement method of the related art, the multiple beam patterns are implemented by using an expensive spatial light modulator (SLM). However, in the case of the optical device with variable focused beam pattern according to the present invention, the multiple regular focused beam patterns can be output by using a combination of the polarizations of the incident beam. In addition, a combination of a polarization-controlled optical device and the optical device with variable focused beam pattern as a simpler optical device combination than that of the related art can be applied to a beam pattern forming apparatus for implementing an optical 3D topology measurement apparatus In addition, in the optical device with variable focused beam pattern according to the present invention according to the first and second embodiments, if an optical member such as a twisted nematic liquid crystal (TN LC) member for switching the polarization of the incident beam is added to the incident plane, there is an effect in that the characteristic of a 2D array of focusing lenses is switched on/off according to a change of the polarization of the incident beam, and the optical device can be applied to a glasses-free 2D/3D conversion display such as an integral imaging display.

While the present invention has been particularly shown and described with reference to exemplary embodiments thereof, it will be understood by those skilled in the art that various changes in form and details may be made therein without departing from the spirit and scope of the present invention as defined by the appended claims.

INDUSTRIAL APPLICABILITY

An optical device with variable focused beam pattern according to the present invention depending on polarization of an incident beam can be widely used for a 3D display field, a 3D topology measurement apparatus, a polarization measuring apparatus, and the like.

The invention claimed is:

1. An optical device with variable focused beam pattern depending on polarization of an incident beam, comprising:
a first lens structure which is configured by arranging first lenticular lenses which are formed with liquid crystals or liquid crystal polymers having a first extraordinary refractive index axis direction and of which longitudinal axes are aligned with a first alignment direction; and
a second lens structure which is laminated on a beam emitting surface of the first lens structure and configured by arranging second lenticular lenses which are formed with liquid crystals or liquid crystal polymers having a second extraordinary refractive index axis direction and of which longitudinal axes are aligned with a second alignment direction, wherein the first and second lens structures are designed so that the first and second lens structures have a same focal plane, and beam patterns of output light output from the second lens structure are generated on the same focal plane, and wherein the beam pattern of output light output from the second lens structure is determined according to a polarization direction of the incident beam incident on the first lens structure, the first and second extraordinary refractive index axis directions of the first and second lens structures, and the first and second alignment directions of the first and second lens structures.

2. The optical device according to claim 1, wherein each of the first and second lens structures is configured to include:

a lens layer which is configured with liquid crystals or liquid crystal polymers having optical anisotropy and has a convex lens shape; and a substrate layer which is configured with polymers having optical isotropy and has a shape reverse to the shape of the lens layer.

3. The optical device according to claim 2, wherein the extraordinary refractive index of the lens layer is larger than a refractive index of the substrate layer, and wherein an ordinary refractive index of the lens layer is equal to the refractive index of the substrate layer.

4. The optical device according to claim 1, wherein the first alignment direction of the first lens structure and the second alignment direction of the second lens structure are equal to or perpendicular to each other.

5. The optical device according to claim 1, wherein the first extraordinary refractive index axis direction of the first lens structure and the second extraordinary refractive index axis direction of the second lens structure are equal to or perpendicular to each other.

6. The optical device according to claim 1, wherein the alignment directions and the extraordinary refractive index axis directions of the longitudinal axes of the first and second lens structures are equal to or perpendicular to each other.

7. The optical device according to claim 1, wherein an arrangement period of the first lenticular lenses of the first lens structure is determined to be equal to or a multiple of an arrangement period of the second lenticular lenses of the second lens structure, and wherein the arrangement period of the second lenticular lenses of the second lens structure is determined to be a multiple of the arrangement period of the first lenticular lenses of the first lens structure.

8. The optical device according to claim 1, wherein the first and second lenticular lenses are configured with GRIN lenses or Fresnel lenses.

9. The optical device according to claim 1, wherein the alignment directions of the longitudinal axes of the first and second lens structures are perpendicular to each other, and wherein the extraordinary refractive index axis directions of the first and second lens structures are parallel to each other.

10. The optical device according to claim 1, wherein the alignment directions of the longitudinal axes of the first and second lens structures are perpendicular to each other, and wherein the extraordinary refractive index axis directions of the first and second lens structures are perpendicular to each other.

11. The optical device according to claim 1, wherein the alignment directions of the longitudinal axes of the first and second lens structures are parallel to each other, wherein the extraordinary refractive index axis directions of the first and second lens structures are perpendicular to each other, and wherein the arrangement period of the second lenticular lenses of the second lens structure is an integer multiple of the arrangement period of the first lenticular lenses of the first lens structure.

12. The optical device according to claim 1, wherein the alignment directions of the longitudinal axes of the first and second lens structures are parallel to each other, wherein the extraordinary refractive index axis directions of the first and second lens structures are perpendicular to each other, and wherein the arrangement period of the first lenticular lenses of the first lens structure is an integer multiple of the arrangement period of the second lenticular lenses of the second lens structure.

* * * * *